United States Patent
Hagberg et al.

(10) Patent No.: US 10,458,765 B2
(45) Date of Patent: Oct. 29, 2019

(54) PARACHUTE DEVICE FOR DIVISIBLE SHELL

(71) Applicant: BAE SYSTEMS BOFORS AB, Karlskoga (SE)

(72) Inventors: Anders Hagberg, Karlskoga (SE); Anders Ekberg, Kristinehamn (SE); Tomas Hultgren, Upplands Vasby (SE); Jonas Lilja, Upplands Vasby (SE); Olle Norrvi, Upplands Vasby (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 0 days.

(21) Appl. No.: 16/091,784

(22) PCT Filed: Apr. 4, 2017

(86) PCT No.: PCT/SE2017/050336
§ 371 (c)(1),
(2) Date: Oct. 5, 2018

(87) PCT Pub. No.: WO2017/176200
PCT Pub. Date: Oct. 12, 2017

(65) Prior Publication Data
US 2019/0137246 A1    May 9, 2019

(30) Foreign Application Priority Data

Apr. 6, 2016 (SE) ..................... 1630075

(51) Int. Cl.
*F42B 10/56* (2006.01)
*B64D 1/02* (2006.01)
(Continued)

(52) U.S. Cl.
CPC ............. *F42B 10/56* (2013.01); *B64D 1/02* (2013.01); *B64D 17/58* (2013.01); *B64D 17/725* (2013.01); *F42B 12/42* (2013.01)

(58) Field of Classification Search
CPC .. F42B 10/56; F42B 8/24; F42B 12/62; F42B 12/42; F42B 4/28; B64D 1/02; B64D 17/58; B64D 17/725
(Continued)

(56) References Cited

U.S. PATENT DOCUMENTS 1,011,002 A    12/1911    Wunsche
1,365,865 A *   1/1921    Svejda ............... F42B 10/56
                                                      102/340

(Continued)

FOREIGN PATENT DOCUMENTS

GB          19069       10/1913
GB        516292 A      12/1939
(Continued)

OTHER PUBLICATIONS

International Search Report (Jul. 11, 2017) for corresponding International App. PCT/SE2017/050336.

*Primary Examiner* — Michael D David
(74) *Attorney, Agent, or Firm* — WRB-IP LLP

(57) ABSTRACT

A parachute device is provided for a divisible shell that includes an active body and a shell base. The parachute device includes two parachutes, a first, main parachute connected to the active body by parachute lines and a second parachute connected to the shell base.

2 Claims, 2 Drawing Sheets

(51) Int. Cl.
*F42B 12/42* (2006.01)
*B64D 17/58* (2006.01)
*B64D 17/72* (2006.01)

(58) Field of Classification Search
USPC .............. 102/337, 339, 340, 348, 387, 489
See application file for complete search history.

(56) References Cited

U.S. PATENT DOCUMENTS

| | | | | |
|---|---|---|---|---|
| 1,621,421 A * | 3/1927 | Kunzer | ................... | F42B 10/56 102/257 |
| 1,709,644 A * | 4/1929 | Wiley, Jr. | ................ | F42B 10/56 102/260 |
| 1,817,503 A * | 8/1931 | Anderson | ............... | F42B 10/56 102/227 |
| 3,055,300 A | 9/1962 | Stoehr | | |
| 3,113,752 A * | 12/1963 | Brestel | ..................... | B64D 1/02 102/340 |
| 3,145,747 A | 8/1964 | Nourse et al. | | |
| 3,221,656 A | 12/1965 | Sutten | | |
| 3,233,545 A | 2/1966 | Heller | | |
| 3,491,689 A * | 1/1970 | Marcel | ..................... | F42B 12/62 102/340 |
| 3,702,588 A * | 11/1972 | Simmons | ................ | F42B 10/16 102/340 |
| 3,706,257 A * | 12/1972 | Collman | ............ | B65G 65/4827 86/20.12 |
| 3,719,339 A * | 3/1973 | Simmons | .............. | F42B 30/003 102/340 |
| 3,773,284 A | 11/1973 | Matsuo et al. | | |
| 3,791,300 A * | 2/1974 | Prochnow | ............... | F42B 12/62 102/339 |
| 3,863,569 A * | 2/1975 | Simmons | ................ | F42B 10/56 102/340 |
| 4,005,656 A | 2/1977 | Gellerstedt et al. | | |
| 4,013,009 A * | 3/1977 | Claude | ................... | F42B 10/54 102/339 |
| 4,023,495 A | 5/1977 | Fischer et al. | | |
| 4,226,185 A | 10/1980 | Tobler et al. | | |
| 4,294,172 A * | 10/1981 | Rauschert | ............... | F42C 21/00 102/275.9 |
| 4,333,400 A * | 6/1982 | McNelia | ................. | F42C 21/00 102/348 |
| 4,372,215 A * | 2/1983 | Crepin | ..................... | B64D 1/04 102/387 |
| 4,498,393 A | 2/1985 | Fischer et al. | | |
| 4,649,826 A * | 3/1987 | Stevens | ................... | F42B 15/36 102/340 |
| 4,658,725 A * | 4/1987 | Rudenauer | ............ | F42C 15/184 102/223 |
| 4,753,171 A * | 6/1988 | Stessen | ................... | F42B 10/56 102/354 |
| 4,754,706 A * | 7/1988 | Fauvel | ..................... | F42B 12/62 102/489 |
| 4,807,533 A | 2/1989 | Von Entress-Fursteneck | | |
| 4,889,053 A * | 12/1989 | Grosswendt | ............ | F42B 10/56 102/348 |
| 5,020,437 A | 6/1991 | Rieger et al. | | |
| 5,025,729 A * | 6/1991 | Cameron | ................ | F41A 19/58 102/336 |
| 5,054,398 A * | 10/1991 | Dobler | ..................... | F42B 10/56 102/387 |
| 5,107,768 A * | 4/1992 | Langenohl | .............. | F42B 30/08 102/293 |
| 5,239,927 A | 8/1993 | Frye et al. | | |
| 5,299,503 A * | 4/1994 | Frehaut | ................... | F42B 12/62 102/357 |
| 5,315,933 A * | 5/1994 | Paulsson | ................. | F42B 12/62 102/357 |
| 5,317,975 A * | 6/1994 | Sauvestre | ............... | F42B 12/62 102/357 |
| 5,370,057 A * | 12/1994 | Badura | ..................... | F42B 10/56 102/354 |
| 5,386,781 A | 2/1995 | Day | | |
| 5,661,257 A | 8/1997 | Nielson et al. | | |
| 5,684,267 A * | 11/1997 | Dean | ........................ | F42B 12/62 102/293 |
| 5,826,826 A * | 10/1998 | Euskirchen | ................ | B64B 1/58 244/137.3 |
| 7,124,690 B1 * | 10/2006 | Tadros | ..................... | F42B 12/48 102/370 |
| 7,360,489 B1 * | 4/2008 | Han | ........................ | F42B 10/56 102/444 |
| 7,487,728 B2 * | 2/2009 | Cranor | ..................... | F42B 12/40 102/513 |
| 8,074,919 B1 * | 12/2011 | Kulesha | ................ | B64C 27/006 244/139 |
| 8,297,161 B2 * | 10/2012 | Munzner | ................. | F42B 12/42 102/293 |
| 8,708,285 B1 * | 4/2014 | Carreiro | ................ | B64C 39/028 244/190 |
| 9,528,802 B1 * | 12/2016 | Markowitch | ........... | F42B 12/36 |
| 9,797,698 B2 * | 10/2017 | Adams | ................... | F42B 12/625 |
| 10,030,953 B2 * | 7/2018 | Adams | ...................... | F42B 4/28 |

FOREIGN PATENT DOCUMENTS

| | | |
|---|---|---|
| GB | 1298652 | 12/1972 |
| JP | S50124399 A | 9/1975 |
| JP | H09303994 A | 11/1997 |
| WO | 20150251451 A1 | 2/2015 |

* cited by examiner

PARACHUTE DEVICE FOR DIVISIBLE SHELL

BACKGROUND AND SUMMARY

The present invention relates to a parachute device for a divisible shell, for example a shell comprising an active body in the form of an illuminating charge, which after separation from the shell is to be slowed in its descent to the ground.

After firing a shell containing an illuminating charge, the illuminating charge is released from the shell at a predetermined height, a parachute being deployed and slowing the descent of the illuminating charge to the ground. At the same time the bottom part of the shell, referred to as the shell base, is released, this being allowed to fall freely to the ground. The shell base, which weighs approximately 0.8 kg attains a velocity of more than 100 m/s, which harbors a safety risk to persons on the ground.

It is desirable to provide a parachute device designed so that both the illuminating charge and the shell base are slowed in their descent to the ground.

It is also desirable to provide a parachute device having few constituent parts.

Thus, according to an aspect of the present invention, a parachute device has been produced for a divisible shell, comprising an active body and a shell base.

The invention, according to an aspect thereof, is characterized in that the parachute device comprises two parachutes, a first, main parachute connected to the active body of the shell by parachute lines, and a second parachute connected to the base of the shell.

According to a second embodiment of the parachute device according to an aspect of the invention, the second parachute constitutes the packing chute for the main parachute, wherein the second parachute comprises a front, open part, referred to as the base, and a rear part, referred to as the chute, wherein the chute is connected to the shell base by a fixing plate and a fixing screw arranged on the inside of the chute, wherein the fixing plate is fixed to the inside of the shell base by the fixing screw, so that the chute is clamped firmly between the fixing plate and the shell base.

According to a third embodiment of the parachute device according to the invention the base comprises a stretchable, elastic line stitched into a seam around the outer edge of the base, wherein the chute comprises folds with tear seams designed to rupture at a given load, and wherein the chute also comprises drag lines fixed between the outer edge of the base and the inside of the chute, so that the base is slowed due to the air resistance after separation from the shell and deploys at the same time that the shell base, owing to its inertia, moves towards the chute, so that the chute is turned inside out and forms the second parachute.

The invention, according to an aspect thereof, affords a series of advantages and effects, the most important of which are:

A parachute device comprising two parachutes means that both the active body and the shell base can be slowed in their descent to the ground, which affords an additional safeguard and means that the extent of the risk can be reduced.

Using the second parachute as a packing case for the main parachute provides a parachute device having few parts and a low weight.

BRIEF DESCRIPTION OF THE DRAWINGS

Further advantages and effects of the invention will emerge from a study and consideration of the following, detailed description of the invention, at the same time referring to the FIGS. 1-2 of the drawing, in which.

DETAILED DESCRIPTION

Figure 1:
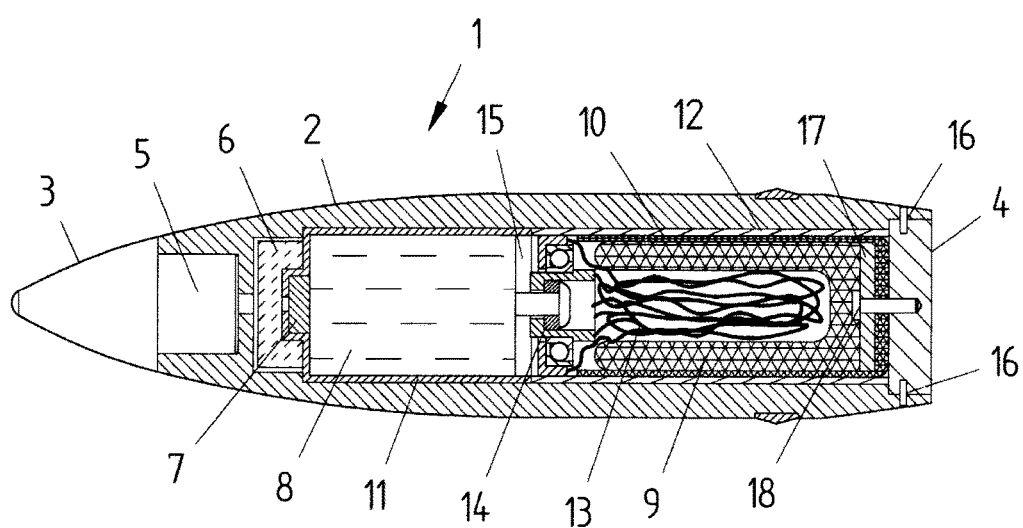
FIG. 1 schematically shows a longitudinal section through a parachute device comprising two parachutes arranged in a divisible shell, comprising a nose cone, a fuze, a shell case, a separating charge, a detonator with delay charge, and an illuminating charge.
Figure 2:
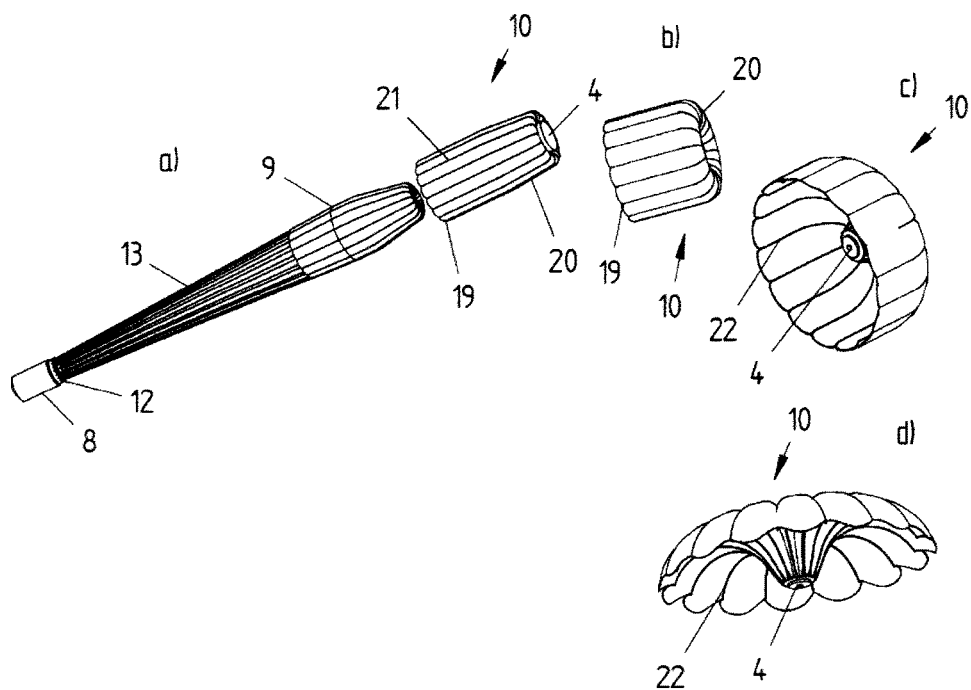
FIG. 2a-2d schematically show a sequence in the course of events in deployment of the two parachutes after separation of the parachute device from the shell.

FIG. 1 shows a longitudinal section through a parachute device arranged in a divisible shell 1. The shell 1 comprises a shell case 2, a nose cone 3, a shell base 4, a fuze 5, a separating charge 6, a detonator device 7 with delay charge, an active body in the form of an illuminating charge 8 and a parachute device comprising two parachutes; a first parachute 9, referred to as the main parachute, for the illuminating charge 8 and a second parachute 10 for the shell base 4.

In a second embodiment of the divisible shell 1, not shown, the active body instead comprises a smoke-generating charge that is to be slowed after separation from the shell 1.

In a third embodiment of the divisible shell 1, not shown, the active body instead comprises an explosive charge that is to be slowed after separation from the shell 1.

The illuminating charge 8 is preferably of conventional pyrotechnic type and is not described in more detail hereinafter. Alternatively, types of illuminating devices 8 other than pyrotechnic illuminating charges may be used.

The illuminating charge 8 with detonator device 7 is fixedly arranged in a cylindrical sleeve 11 in the front part of the shell 1 behind the fuze 5 and the separating charge 6. The parachute device having the two parachutes 9,10 is arranged in a divisible tubular sleeve 12, which extends between the shell base 4, and the cylindrical sleeve 11 with the illuminating charge 8. The divisible sleeve 12 divides and is separated from the parachute device after separation from the shell 1. The main parachute 9 is packed in the second parachute 10, which thereby constitutes the packing chute or packing case of the main parachute 9. The main parachute 9 is connected to the cylindrical sleeve 11 by parachute lines 13, packed inside the main parachute 9. The parachute lines 13 are connected to the sleeve 11 with the illuminating charge 8 by a ball bearing-guided pivot 14, arranged at the rear end 15 of the sleeve 11.

The shell base 4 is fitted to the rear end of the shell 1 by two or more fracture pins 16, which are designed to rupture at a given compressive loading from the separating charge 6. The second parachute 10 is connected to the shell base 4 by a fixing plate 17 and a fixing screw 18, which are arranged on the inside of the second parachute 10. The fixing plate 17 is fitted to the inside of the shell base 4 by the fixing screw 18, so that the rear part of the second parachute 10 is clamped firmly between the fixing plate 17 and the shell base 4.

The fuze 5 of the shell 1 is activated in conjunction with the firing of the shell 1. When the shell 1 is at a specific height above an intended target area, the fuze 5 initiates the separating charge 6, either by remote control or through preprogramming, the explosive pressure of the separating charge 5 acting on the cylindrical sleeve 11 containing the illuminating charge 8, the cylindrical sleeve 11 in turn acting on the divisible sleeve 12 containing the parachute device, the divisible sleeve 12 finally acting on the shell base 4, so that the fracture pins 16 between the shell case 2 and the shell base 4 rupture, the cylindrical sleeve 11 with the illuminating charge 8, the divisible sleeve 12 with the parachute device and the shell base 4 being released from the shell 1. In conjunction with the initiation of the separating charge 6, the detonator device 7 with delay charge of the illuminating charge 8 is also initiated, so that the illuminating charge 8 is initiated after separation from the shell 1 and after a specific time delay.

The second parachute 10, which constitutes the packing chute or case of the main parachute 9, comprises a front, open part, referred to as the base 19, and a rear part, referred to as the chute 20. The chute 20, which encloses the main parachute 9, is arranged in the divisible sleeve 12 and comprises folds. The chute 20 also preferably comprises tear seams 21, which are designed to rupture at a given loading from the surrounding air flows on separation from the main parachute 9. The base 19 comprises a stretchable, elastic line or wires, preferably an elastic line, stitched into a seam around the outer edge of the base 19, not shown.

The chute 20 further comprises longitudinal drag lines 22 fixed between the outer edge of the base 19 and the inside of the chute 20, so that the base 19, after separation of the second parachute 10 from the main parachute 9, is slowed due to the surrounding air flow, and deploys at the same time that the shell base 1, owing to its inertia, moves in the opposite direction to the chute 20, so that the chute 20 is at least partially turned inside out and is deployed to form the second parachute 10. See the sequence in the course of events, FIG. 2*a*-*d*.

The stretchable elastic line and the drag lines 22 help to keep the base 19 dimensionally stable during the process when the chute 20 is turned inside out and deployed to form the second parachute 10 in a predefined manner.

The invention is not limited to the embodiments shown, but can be modified in various ways without departing from the scope of the patent claims.

The invention claimed is:

1. A parachute device and a divisible shell, the divisible shell comprising an active body and a shell base, and the parachute device comprising two parachutes, a first, main parachute connected to the active body by parachute lines and a second parachute connected to the shell base, wherein the main parachute is packed in the second parachute, wherein the second parachute comprises a front, open base, and a rear chute, wherein the chute is connected to the shell base by a fixing plate and a fixing screw arranged on an inside of the chute, wherein the fixing plate is fixed to an inside of the shell base by the fixing screw, so that the chute is clamped between the fixing plate and the shell base.

2. The parachute device as claimed in claim 1, wherein the base comprises a stretchable, elastic line stitched into a seam around an outer edge of the base, wherein the chute comprises folds with tear seams designed to rupture at a given load, and wherein the chute comprises drag lines fixed between the outer edge of the base and the inside of the chute, so that the base is slowed due to resistance of surrounding air after separation from the shell and deploys at a same time that inertia of the shell base moves the shell base in a direction opposite to a direction of the chute so that the chute is turned inside out and forms the second parachute.

* * * * *